(12) United States Patent
Merlo et al.

(10) Patent No.: US 9,217,045 B2
(45) Date of Patent: Dec. 22, 2015

(54) PURIFICATION OF FLUOROIONOMER COMPOSITIONS

(75) Inventors: Luca Merlo, Montorfano (IT); Alessandro Ghielmi, Milan (IT); Alexander Chistyakov, Bollate (IT)

(73) Assignee: SOLVAY SPECIALTY POLYMERS ITALY S.P.A., Bollate (Milano) (IT)

( * ) Notice: Subject to any disclaimer, the term of this patent is extended or adjusted under 35 U.S.C. 154(b) by 421 days.

(21) Appl. No.: 13/132,611

(22) PCT Filed: Dec. 10, 2009

(86) PCT No.: PCT/EP2009/066788
§ 371 (c)(1),
(2), (4) Date: Jun. 3, 2011

(87) PCT Pub. No.: WO2010/066823
PCT Pub. Date: Jun. 17, 2010

(65) Prior Publication Data
US 2011/0240559 A1    Oct. 6, 2011

(30) Foreign Application Priority Data

Dec. 11, 2008 (EP) .................................. 08171285

(51) Int. Cl.
*C08F 6/02* (2006.01)
(52) U.S. Cl.
CPC ........................................ *C08F 6/02* (2013.01)
(58) Field of Classification Search
CPC ......... C08L 27/00; C08L 27/14; C08L 27/18; C08L 27/20

USPC ........ 523/310; 210/660; 526/243; 521/27, 28
See application file for complete search history.

(56) References Cited

U.S. PATENT DOCUMENTS

| 4,433,082 | A | 2/1984 | Grot |
| 6,150,426 | A | 11/2000 | Curtin et al. |
| 7,304,101 | B2 * | 12/2007 | Hintzer et al. ................ 523/310 |
| 8,409,766 | B2 * | 4/2013 | Merlo et al. .................. 429/494 |
| 2006/0014886 | A1 | 1/2006 | Hintzer et al. |
| 2006/0014887 | A1 | 1/2006 | Hamrock et al. |
| 2006/0199062 | A1 | 9/2006 | Yanagita et al. |
| 2008/0039599 | A1 * | 2/2008 | Du et al. .......................... 526/89 |
| 2012/0076990 | A1 * | 3/2012 | Merlo et al. .................. 428/189 |
| 2012/0289616 | A1 * | 11/2012 | Arcella et al. ................. 521/27 |

FOREIGN PATENT DOCUMENTS

| EP | 1004615 A2 | 5/2000 |
| EP | 1535950 A1 | 6/2005 |
| GB | 1286859 A | 8/1972 |
| WO | WO 03034529 A1 | 4/2003 |

* cited by examiner

*Primary Examiner* — Hannah Pak

(57) ABSTRACT

A process for the purification from ionic impurities of a fluoroionomer liquid composition, comprising: providing a liquid composition comprising at least one fluoroionomer (I-1) in a liquid medium, the liquid composition comprising ionic impurities; contacting the liquid composition with a solid particulate comprising at least one fluoroionomer (I-2) having ion exchange groups, wherein $H^+$ or $OH^-$ ions are bound to at least a fraction of such ion exchange groups, and separating the liquid composition from the solid particulate.

17 Claims, No Drawings

PURIFICATION OF FLUOROIONOMER COMPOSITIONS

CROSS-REFERENCE TO RELATED APPLICATIONS

This application is a U.S. national stage entry under 35 U.S.C. §371 of International Application No. PCT/EP2009/066788 filed Dec. 10, 2009, which claims priority to European Application No. 08171285.3 filed Dec. 11, 2008, the whole content of this application being herein incorporated by reference for all purposes.

TECHNICAL FIELD

The invention provides a method for purifying a liquid composition of a fluoroionomer from ionic impurities.

BACKGROUND ART

Liquid compositions of (per)fluorinated ion exchange polymers are known for use in the manufacture, and possibly repair, of ion exchange membranes, for membrane coatings containing conductive and non-conductive particles, and for many other uses. While such compositions are sometimes referred to as solutions, the compositions are generally recognized as being dispersions (in other words, colloidal suspensions) of polymer particles.

Liquid compositions are typically prepared by dissolving/ suspending in an appropriate aqueous or aqueous-alcoholic medium the (per)fluorinated ion exchange polymer. Methods useful for obtaining such liquid dispersions are notably taught in U.S. Pat. No. 4,433,082 (DUPONT DE NEMOURS) 21 Feb. 1984, GB 1286859 (DU PONT) 23 Aug. 1972, EP 1004615 A (AUSIMONT S.P.A.) 31 May 2000 and U.S. Pat. No. 6,150,426 (DUPONT DE NEMOURS) 21 Nov. 2000.

Generally, the above mentioned processes for dispersing (per)fluorinated ion exchange polymers involve harsh conditions, in particular high temperatures and thus require highly specialized equipment able to withstand corrosion from the aggressive acidic groups of the (per)fluorinated ion exchange polymer.

In such conditions, contamination of the dispersion with ions, in particular metal ions is generally unavoidable. Additional ionic impurities might derive from other manufacturing steps of the (per)fluorinated ion exchange polymer, like notably polymerization (e.g. residues from initiators) and/or hydrolysis steps.

Even low levels of ionic impurities (cations, in particular) contained in liquid compositions of (per)fluorinated ion exchange polymers are considered today as possibly negatively affecting the performance of membranes obtainable from the ion exchange polymers, in particular of membranes used in fuel cell applications. As a matter of fact, the presence of ions in any part of the fuel cell assembly might lead to the 'neutralization' of the acidic groups comprising mobile protons, which might in turn transform into ionically non-conductive counterparts. Furthermore, certain metal ions (e.g. Fe, Cr, Cu, Ti . . . ) have been recognized as acting as catalysts, in oxidative conditions like those of the fuel cell, for the formation of peroxide radicals that accelerate the degradation of the membrane.

In a nut-shell, very low levels of ions in the starting (per) fluorinated ion exchange polymer dispersions are believed to be associated with increased durability, performance, and quality of the final membrane: thus purification from ions, and especially from cations, has become part of good practice in the manufacture of liquid compositions of (per)fluorinated ion exchange polymers.

To this aim, US 2006014886 (3M INNOVATIVE PROPERTIES CO) 19 Jan. 2006 and US 2006014887 (3M INNOVATIVE PROPERTIES CO) 19 Jan. 2006 teach the use of cation exchange resins (e.g. polysulfonates or polysulfonic acids, polycarboxylates or polycarboxylic acids) for removing ions from ionic fluoropolymer dispersions.

Traditional ion exchange resins might release organic chemicals, in particular when exposed to strongly acidic conditions provided by the liquid composition of (per)fluorinated ion exchange polymers, so that risk of further contamination by organic compounds cannot be avoided. Also, ion exchange conditions with traditional resins are limited to room temperature, as these resins are often endowed with poor thermal stability.

US 20060199062 (ASAHI KASEI CHEMICAL CORP.) 7 Sep. 2006 discloses the possibility of removing the excess of alkali metals from a solution containing a perfluorocarbonsulfonic acid resin a polyazole-based compound and an alkali metal hydroxyde by means of either a strongly acidic cation exchange resin as well as by means of a dialysis treatment using a cation-exchange membrane. Such a dialysis treatment may not be sufficient to remove the alkali metal ions tightly bound to the perfluorosulfonic acid resin.

DISCLOSURE OF INVENTION

It is thus an object of the present invention a process for the purification from ionic impurities of a fluoroionomer liquid composition, said process comprising:
providing a liquid composition comprising at least one fluoroionomer (1-1) in a liquid medium, said liquid composition comprising ionic impurities; and
contacting said liquid composition with a solid particulate comprising at least one fluoroionomer (1-2) having ion exchange groups, wherein $H^+$ or $OH^-$ ions are bound to at least a fraction of said ion exchange groups, and
separating said liquid composition from said solid particulate.

The Applicant has surprisingly found that by means of the process of the invention it is advantageously possible to efficiently purify liquid compositions of fluoroionomer (I-1), at the same time avoiding the risk of release of contaminants from the solid particulate.

The expression "ionic impurities" is used herein to refer to ions different from $H^+$ and $OH^-$ which are present in the liquid composition, either bound to the cation exchange groups of the fluoroionomer (I-1) or not bound to the fluoroionomer (I-1), but rather solubilised or dispersed in the liquid medium.

Ionic impurities may be anionic or cationic. Among cationic impurities, metal cations can be mentioned.

As used herein, the term "purification" refers to the operation of at least partially removing said ionic impurities, regardless of whether the removal is complete or not, that is to say that the "purification" of the invention encompasses those methods wherein at least a portion of the ionic impurities are removed from the liquid composition.

It is nevertheless preferred to use the process of the invention for the removal of cationic impurities, that is to say that the method of the invention is preferably a process for the purification from cationic impurities.

According to this preferred embodiment, the process of the invention advantageously enables the purification of the liquid composition to obtain a residual total metal content in the purified liquid composition of less than 20 ppm, preferably less than 15 ppm, more preferably less than 10 ppm.

Within the context of the present invention the expressions "at least one fluoroionomer (I-1)" and "at least one fluoroionomer (I-2)" are intended to denote one or more than one fluoroionomer (I-1) or (I-2). Mixtures of fluoroionomers (I-1) or mixtures of fluoroionomer (I-2) can be advantageously used for the purposes of the invention.

In the remainder of the text, the expressions "fluoroionomer (I-1)" and "fluoroionomer (I-2)" are to be understood, for the purposes of the present invention, both in the plural and in the singular, that is to say that the inventive composition may comprise one or more than one fluoroionomer (I-1) or one or more than one fluoroionomer (I-2).

Fluoroionomer (I-1) and fluoroionomer (I-2) are fluoroionomers (I), that is to say that all features described here below for fluoroionomer (I) apply both but independently to fluoroionomer (I-1) and fluoroionomer (I-2).

For the purpose of the present invention, the term "fluoroionomer (I)" is intended to denote any polymer comprising:
  recurring units derived from at least one ethylenically unsaturated monomer comprising at least one fluorine atom (fluorinated monomer, hereinafter); and
  a substantial amount of recurring units derived from at least one ethylenically unsaturated monomer comprising at least one ion exchange group (functional monomer, hereinafter).

The expression "at least one ethylenically unsaturated monomer comprising at least one fluorine atom [fluorinated monomer]" is understood to mean that the fluoroionomer can comprise recurring units derived from one or more than one fluorinated monomer.

In the remainder of the text, the expression "fluorinated monomer" is to be understood, for the purposes of the present invention, both in the plural and in the singular.

The fluorinated monomer can further comprise one or more other halogen atoms (Cl, Br, I). When the fluorinated monomer is free of hydrogen atom, it is designated as "per(halo)fluoromonomer". When the fluorinated monomer comprises at least one hydrogen atom, it is designated as "hydrogen-containing fluorinated monomer".

Non limitative examples of fluorinated monomers are notably tetrafluoroethylene (TFE), vinylidene fluoride (VdF), chlorotrifluoroethylene (CTFE), and mixtures thereof.

Optionally, the fluoroionomer may comprise recurring units derived from one first monomer, said monomer being a fluorinated monomer as above described, and at least one other monomer [comonomer (CM), hereinafter].

Hereinafter, the term comonomer (CM) should be intended to encompass both one comonomer and two or more comonomers.

The comonomer (CM) can notably be either hydrogenated (i.e. free of fluorine atoms) [comonomer (HCM), hereinafter] or fluorinated (i.e. containing at least one fluorine atom) [comonomer (FCM), hereinafter].

Non limitative examples of suitable hydrogenated comonomers (HCM) are notably ethylene, propylene, vinyl monomers such as vinyl acetate, acrylic monomers, like methyl methacrylate, acrylic acid, methacrylic acid and hydroxyethyl acrylate, as well as styrene monomers, like styrene and p-methylstyrene.

Non limitative examples of suitable fluorinated comonomers (FCM) are notably:
  $C_3$-$C_8$ fluoro- and/or perfluoroolefins, such as hexafluoropropene, pentafluoropropylene, and hexafluoroisobutylene;
  $C_2$-$C_8$ hydrogenated monofluoroolefins, such as vinyl fluoride;
  1,2-difluoroethylene, vinylidene fluoride and trifluoroethylene;
  perfluoroalkylethylenes complying with formula $CH_2=CH-R_{f0}$, in which $R_{f0}$ is a $C_1$-$C_6$ perfluoroalkyl;
  chloro- and/or bromo- and/or iodo-$C_2$-$C_6$ fluoroolefins, like chlorotrifluoroethylene;
  fluoroalkylvinylethers complying with formula $CF_2=CFOR_{f1}$ in which $R_{f1}$ is a $C_1$-$C_6$ fluoro- or perfluoroalkyl, e.g. $-CF_3$, $-C_2F_5$, $-C_3F_7$;
  fluoro-oxyalkylvinylethers complying with formula $CF_2=CFOX_0$, in which $X_0$ is a $C_1$-$C_{12}$ oxyalkyl, or a $C_1$-$C_{12}$ (per)fluorooxyalkyl having one or more ether groups, like perfluoro-2-propoxy-propyl;
  fluoroalkyl-methoxy-vinylethers complying with formula $CF_2=CFOCF_2OR_{f2}$ in which $R_{f2}$ is a $C_1$-$C_6$ fluoro- or perfluoroalkyl, e.g. $-CF_3$, $-C_2F_5$, $-C_3F_7$ or a $C_1$-$C_6$ (per)fluorooxyalkyl having one or more ether groups, like $-C_2F_5-O-CF_3$;
  fluorodioxoles, of formula:

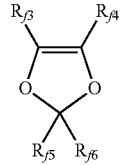

wherein each of $R_{f3}$, $R_{f4}$, $R_{f5}$, $R_{f6}$, equal or different each other, is independently a fluorine atom, a $C_1$-$C_6$ fluoro- or per(halo)fluoroalkyl, optionally comprising one or more oxygen atom, e.g. $-CF_3$, $-C_2F_5$, $-C_3F_7$, $-OCF_3$, $-OCF_2CF_2OCF_3$.

As defined above, fluoroionomer (I) useful for the process of the present invention comprises a substantial amount of recurring units derived from at least one functional monomer.

The expression "substantial amount" in the definition here above is intended to denote an amount of recurring units derived from the functional monomer which is effective to modify the polymer in its properties. Generally, a substantial amount is of at least 1% by moles, based on the total moles of recurring units.

The expression "ion exchange group" is used here in its general meaning as intended in organic chemistry and it encompasses atoms or combination of atoms bonded to the carbon skeleton of the ethylenically unsaturated monomer, which confers to said ethylenically unsaturated monomer ability to trap and release (i.e. exchange) ions in a process called ion exchange. Generally cation exchange groups are negatively charged moieties while anion exchange groups are positively charged moieties.

Non limitative examples of ion exchange groups are notably those complying with formula:
  $-SO_2X$, wherein X is chosen among halogens (Cl, F, Br, I), $-O^-M^+$, wherein $M^+$ is a cation selected among $H^+$, $NH_4^+$, $K^+$, $Li^+$, $Na^+$, or mixtures thereof; preferably $X=-O^-H^+$.
  $-COY$, wherein Y is chosen among halogens (Cl, F, Br, I); $-O^-M^+$, wherein $M_+$ is a cation selected among $H^+$, $NH_4^+$, $K^+$, $Li^+$, $Na^+$; $-OR_{Hy}$, wherein $R_{Hy}$ is a $C_1$-$C_6$ hydrocarbon group; $-OR_{Hf}$ wherein $R_{Hf}$ is a $C_1$-$C_6$ fluorocarbon or per(halo)fluorocarbon group;
—N($R_{Hy}$*)$_2$, wherein $R_{Hy}$*, equal or different at each occurrence, is hydrogen or a $C_1$-$C_6$ hydrocarbon group, or mixtures thereof; preferably Y=—O⁻H⁺.

—PO$_2$Z, wherein Z is chosen among halogens (Cl, F, Br, I); —O⁻M⁺, wherein M⁺ is a cation selected among H⁺, NH$_4$⁺, K⁺, Li⁺, Na⁺; —O$R_{Hy}$, wherein $R_{Hy}$ is a $C_1$-$C_6$ hydrocarbon group, and —O$R_{Hf}$, wherein $R_{Hf}$ is a $C_1$-$C_6$ fluorocarbon or per(halo)fluorocarbon group, or mixture thereof; preferably Z=—O⁻H⁺.

—N($R_{Hy}$*)$_3$⁺Y'⁻, wherein $R_{Hy}$*, equal or different at each occurrence, is hydrogen or a $C_1$-$C_6$ hydrocarbon group, or mixtures thereof; Y'⁻ is a monovalent anion, preferably Y'=Cl⁻, OH⁻.

—N($R_{Hy}$*)$_{3-m}$($R_{OH}$)$_m$⁺Y'⁻, wherein $R_{Hy}$*, equal or different at each occurrence, is hydrogen or a $C_1$-$C_6$ hydrocarbon group, or mixtures thereof; $R_{OH}$, equal or different at each occurrence, is hydrogen or a $C_1$-$C_6$ hydrocarbon group comprising at least one hydroxyl group; m is an integer from 1 to 3; Y'⁻ is a monovalent anion, preferably Y'=Cl⁻, OH⁻.

—CO—N$R_{Hy}$*-E-N($R_{Hy}$*)$_3$⁺Y'⁻, wherein E is a divalent hydrocarbon moiety, $R_{Hy}$* equal or different at each occurrence, is hydrogen or a $C_1$-$C_6$ hydrocarbon group, or mixtures thereof; Y'— is a monovalent anion, preferably Y'=Cl⁻, OH⁻.

—SO$_2$—N$R_{Hy}$*-E-N($R_{Hy}$*)$_3$⁺Y'⁻, wherein E is a divalent hydrocarbon moiety, $R_{Hy}$* equal or different at each occurrence, is hydrogen or a $C_1$-$C_6$ hydrocarbon group, or mixtures thereof; Y'— is a monovalent anion, preferably Y'=Cl⁻, OH⁻.

Should the process of the invention be a process for the purification from cationic impurities, ion exchange groups are cation exchange groups. Should the process of the invention be a process for the purification from anionic impurities, ion exchange groups are anion exchange groups.

Should the functional monomer comprise, in addition to fluorine atoms optionally comprised in the functional group, at least one fluorine atom which is not comprised in the functional group, it is designated as fluorinated functional monomer. Should the functional monomer be free of fluorine atoms other than those optionally comprised in the functional group, it is designated as hydrogenated functional monomer.

The fluorinated monomer and the fluorinated functional monomer may be the same monomer or may be different monomers, that is to say that the fluoroionomer (I) can be a homopolymer of a fluorinated functional monomer, or can be a copolymer of one or more than one fluorinated monomer and one or more than one functional monomer, fluorinated or hydrogenated.

Preferably, the fluoroionomer (I) comprises recurring units derived from at least one fluorinated functional monomer chosen among:
(M1) sulfonated perfluoroolefin of formula (M1):

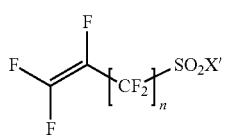

(M1)

wherein n is an integer between 0 and 6 and X' is chosen among halogens (Cl, F, Br, I), —O⁻M⁺, wherein M⁺ is a cation selected among H⁺, NH$_4$⁺, K⁺, Li$_+$, Na⁺, or mixtures thereof, preferably X'=—O⁻H⁺; preferred sulfonated perfluoroolefin are those complying with formulae (M1-A) and (M1-B):

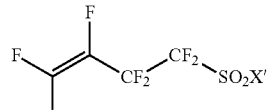

(M1-A)

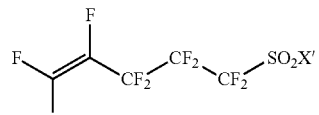

(M1-B)

wherein X' has the same meaning as above defined;
(M2) sulfonated perfluorovinylethers of formula (M2):

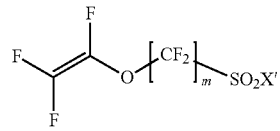

(M2)

wherein m is an integer between 1 and 10 and X' is chosen among halogens (Cl, F, Br, I), —O⁻M⁺, wherein M⁺ is a cation selected among H⁺, NH$_4$⁺, K⁺, Li⁺, Na⁺, or mixtures thereof, preferably X'=—O⁻H⁺; preferred are sulfonated perfluorovinylethers of formulae (M2-A), (M2-B) and (M2-C):

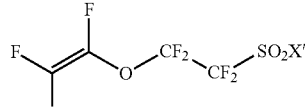

(M2-A)

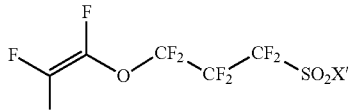

(M2-B)

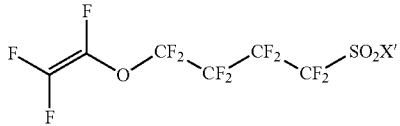

(M2-C)

wherein X' has the same meaning as above defined; most preferably, the sulfonated perfluorovinylether is perfluoro-5-sulphonylfluoride-3-oxa-1-pentene (also known as "SFVE") of formula (M2-D):

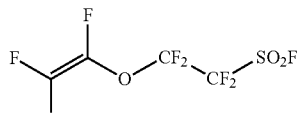

(M2-D)

which can be in its —SO$_2$F form or, preferably, in any of the —SO$_2$X' forms, as above detailed, more preferably in its —SO$_3$H form.

(M3) sulfonated perfluoroalkoxyvinylethers of formula (M3):

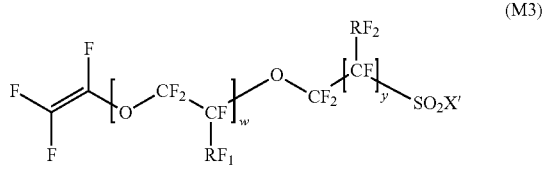

wherein w is an integer between 0 and 2, RF$_1$ and RF$_2$, equal or different from each other and at each occurrence, are independently —F, —Cl or a C$_{1-10}$ perfluoroalkyl group, optionally substituted with one or more ether oxygens, y is an integer between 0 and 6 and X' is chosen among H, halogens (Cl, F, Br, I), —O$^-$M$^+$, wherein M$^+$ is a cation selected among H$^+$, NH$_4^+$, K$^+$, Li$^+$, Na$^+$, or mixtures thereof; preferably X' is —O$^-$H$^+$; preferred sulfonated perfluoroalkoxyvinylether complies with formula (M3) here above, wherein w is 1, RF$_1$ is —CF$_3$, y is 1 and RF$_2$ is —F and X' is F [formula (M3-A), also called "PSEPVE" (perfluoro-2-(2-fluorosulfonylethoxy)propylvinyl ether)]:

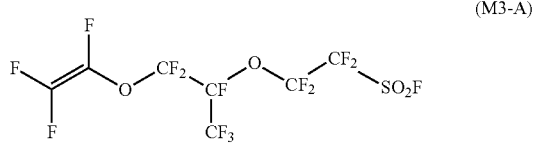

which can be in its —SO$_2$F form or, preferably, in any of the —SO$_2$X' forms, as above detailed, more preferably in its —SO$_3$H form.

(M4) perfluoroalkoxyvinylether carboxylates of formula (M4):

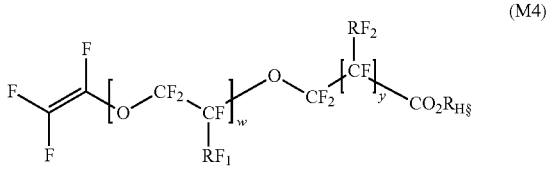

wherein w, y, RF$_1$ and RF$_2$ have the same meaning as above defined, and R$_{H\S}$ is a C$_{1-10}$ alkyl or fluoroalkyl group; preferred perfluoroalkoxyvinylether carboxylate complies with formula (M4) here above, wherein w is 0, y is 2, R$_{H\S}$ is methyl and RF$_2$ is —F [formula (M4-A)]:

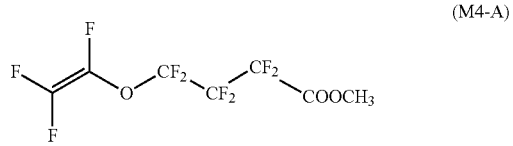

(M5) sulfonated aromatic (per)fluoroolefins of formula (M5):

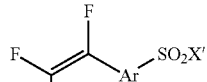

wherein Ar is a C$_{3-15}$ aromatic or heteroaromatic moiety and X' is chosen among halogens (Cl, F, Br, I), —O$^-$M$^+$, wherein M$^+$ is a cation selected among H$^+$, NH$_4^+$, K$^+$, Li$^+$, Na$^+$, or mixtures thereof, preferably X'=—O$^-$H$^+$; and (M6) mixtures thereof.

Should the fluoroionomer (I) comprise recurring units derived from monomers of type (M1), (M2), (M3) or (M5), as above detailed, sulphonic groups comprised therein can be further functionalized by reaction with diamines of formula H(R$_{Hy^*}$)N-E-N(R$_{Hy^*}$)$_2$, wherein E is a divalent hydrocarbon moiety, R$_{Hy}$* equal or different at each occurrence, is hydrogen or a C$_1$-C$_6$ hydrocarbon group, so as to yield a sulphonamide moiety of formula —SO$_2$—N(R$_{Hy^*}$)-E-N(R$_{Hy^*}$)$_2$, which can be easily quaternized using suitable alkylating agents for yielding corresponding —SO$_2$—N(R$_{Hy^*}$)-E-N(R$_{Hy^*}$)$_3^+$Y'$^-$ group, with Y'$^-$ being a monovalent anion, preferably Y'=Cl$^-$, OH$^-$.

Should the fluoroionomer (I) comprise recurring units derived from monomers of type (M4), as above detailed, carboxylic groups comprised therein can be further functionalized by reaction with diamines of formula H(R$_{Hy^*}$)N-E-N(R$_{Hy^*}$)$_2$, wherein E is a divalent hydrocarbon moiety, R$_{Hy}$* equal or different at each occurrence, is hydrogen or a C$_1$-C$_6$ hydrocarbon group, so as to yield an amide moiety of formula —CO—N(R$_{Hy^*}$)-E-N(R$_{Hy^*}$)$_2$, which can be easily quaternized using suitable alkylating agents for yielding corresponding —CO—N(R$_{Hy^*}$)-E-N(R$_{Hy^*}$)$_3^+$Y'$^-$ group, with Y'$^-$ being a monovalent anion, preferably Y'=Cl$^-$, OH$^-$.

Optionally, in addition to recurring units derived from fluorinated monomer(s) and functional monomer(s), the fluoroionomer (I) can further comprise recurring units derived from at least one bis-olefin chosen among those of formulae:
(OF-1)

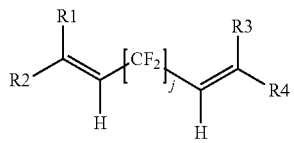

wherein j is an integer between 2 and 10, preferably between 4 and 8, and R1, R2, R3, R4, equal or different from each other, are H, F or C$_{1-5}$ alkyl or (per)fluoroalkyl group;
(OF-2)

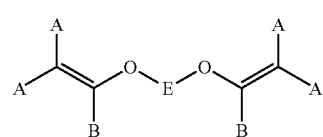

wherein each of A, equal or different from each other and at each occurrence, is independently selected from F, Cl, and H; each of B, equal or different from each other and at each occurrence, is independently selected from F, Cl, H and OR$_B$, wherein R$_B$ is a branched or straight chain alkyl radical which can be partially, substantially or completely fluorinated or chlorinated; E is a divalent group having 2 to 10 carbon atom, optionally fluorinated, which may be inserted with ether linkages; preferably E is a —$(CF_2)_m$— group, with m being an integer from 3 to 5; a preferred bis-olefin of (OF-2) type is $F_2C=CF-O-(CF_2)_5-O-CF=CF_2$. (OF-3)

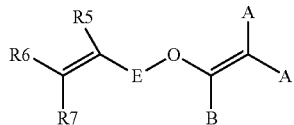

wherein E, A and B have the same meaning as above defined; R5, R6, R7, equal or different from each other, are H, F or $C_{1-5}$ alkyl or (per)fluoroalkyl group.

Should the fluoroionomer (I) comprise recurring units derived from a bis-olefin as above defined, it advantageously comprises said recurring units in an amount in the range from 0.01 to 5% by moles, with respect to all recurring units of fluoroionomer.

Preferably, the fluoroionomer (I) is free from recurring units derived from bis-olefins as above specified.

The fluoroionomer (I) is preferably a per(halo)fluoroionomer.

For the purpose of the invention, the term "per(halo)fluoroionomer" is intended to denote a fluoroionomer substantially free of hydrogen atoms.

The term "substantially free of hydrogen atom" is understood to mean that the per(halo)fluoroionomer consists essentially of:
recurring units derived from one or more than one ethylenically unsaturated monomer comprising at least one fluorine atom and free from hydrogen atoms (per(halo)fluoromonomer, hereinafter); and
recurring units derived from one or more than one ethylenically unsaturated monomer comprising at least one fluorine atom and at least one ion exchange group, and free from hydrogen atoms (except those optionally comprised in the ion exchange group) (functional per(halo)fluoromonomer, hereinafter).

The per(halo)fluoromonomer and the functional per(halo)fluoromonomer may be the same monomer or may be different monomers, that is to say that the per(halo)fluoroionomer can be a homopolymer of a functional per(halo)fluoromonomer, or can be a copolymer of one or more than one per(halo)fluoromonomer and one or more than one functional per(halo)fluoromonomer.

The expression "consisting essentially of" when used in connection with the composition of fluoroionomer (I) should be interpreted to mean that fluoroionomer (I) consists of the indicated monomeric units with the sole addition of the chain-end groups which may derive from the initiator and possibly chain transfer agent used in the polymerization reaction, as known in the art.

Preferably fluoroionomer (I) is chosen among per(halo)fluoroionomer comprising (preferably consisting essentially of) recurring units derived from at least one functional per(halo)fluoromonomer and at least one per(halo)fluoromonomer chosen among:
$C_3$-$C_8$ perfluoroolefins, preferably tetrafluoroethylene (TFE) and/or hexafluoropropylene (HFP);
chloro- and/or bromo- and/or iodo-$C_2$-$C_6$ per(halo)fluoroolefins, like chlorotrifluoroethylene (CTFE) and/or bromotrifluoroethylene;

perfluoroalkylvinylethers (PAVE) complying with formula $CF_2=CFOR_{f1}$ in which $R_{f1}$ is a $C_1$-$C_6$ perfluoroalkyl, e.g. —$CF_3$, —$C_2F_5$, —$C_3F_7$;
perfluoro-oxyalkylvinylethers complying with formula $CF_2=CFOX_0$, in which $X_0$ is a $C_1$-$C_{12}$ perfluorooxyalkyl having one or more ether groups, like perfluoro-2-propoxy-propyl.

Still preferably fluoroionomer (I) is chosen among tetrafluoroethylene (TFE) copolymers comprising (preferably consisting essentially of) recurring units derived from at least one functional per(halo)fluoromonomer as above defined.

More preferably fluoroionomer (I) is chosen among tetrafluoroethylene (TFE) copolymers comprising (preferably consisting essentially of) recurring units derived from at least one functional per(halo)fluoromonomer M1 to M6 as above defined.

Preferred functional per(halo)fluoromonomers are notably sulfonated perfluorovinylethers of formula (M2) as above detailed and sulfonated perfluoroalkoxyvinylethers of formula (M3) as above detailed, and mixtures thereof.

Even more preferably fluoroionomer (I) is selected among TFE copolymers comprising (preferably consisting essentially of) recurring units derived from PSEPVE (formula M3-A here above) and/or SFVE (formula M2-D here above), in their —$SO_2F$ or —$SO_2X"$ form, wherein $X"$ is chosen among halogens (Cl, Br, I), —$O^-M^+$, wherein $M^+$ is a cation selected among $H^+$, $NH_4^+$, $K^+$, $Li^+$, $Na^+$, or mixtures thereof.

Still more preferably fluoroionomer (I) is selected among TFE copolymers comprising (preferably consisting essentially of):
from 5 to 30% by moles of recurring units derived from PSEPVE and/or SFVE, in their —$SO_2F$ or —$SO_2X"$ form, wherein $X"$ is chosen among halogens (Cl, Br, I), —$O^-M^+$, wherein $M^+$ is a cation selected among $H^+$, $NH_4^+$, $K^+$, $Li^+$, $Na^+$, or mixtures thereof; and
from 95 to 70% by moles of recurring units derived from TFE.

According to a preferred embodiment of the invention, the fluoroionomer (I) is chosen among TFE copolymers as above described wherein the functional monomer is SFVE, in its —$SO_2F$ or —$SO_2X"$ form, wherein $X"$ is chosen among halogens (Cl, Br, I), —$O^-M^+$, wherein M is a cation selected among $H^+$, $NH_4^+$, $K^+$, $Li^+$, $Na^+$, or mixtures thereof.

The choice of the ions bound to the negatively or positively charged moiety in the fluoroionomer (I-1) is not critical. Typical cations bound to negatively charged ion exchange groups are for instance sodium ($Na^+$), potassium ($K^+$), ammonium ($NH_4^+$) or hydrogen ($H^+$). Typical anions bound to positively charged ion exchange groups are for instance chlorine ($Cl^-$) or $OH^-$ ions.

The fluoroionomer (I-1) used in the process of the invention preferably comprises cation exchange groups. Preferably fluoroionomer (I-1) has monovalent metal cations, more preferably sodium ($Na^+$), or potassium ($K^+$) ions bound to its cation exchange groups and even more preferably sodium ($Na^+$) ions. These ions have generally low affinities to the sites. It is widely understood that when such exchange sites are exposed to appropriate conditions (e.g. in a reactive environment), cations can be replaced by protons so as to obtain a fluoroionomer possessing labile $H^+$ ions.

On the other side it is essential for the purpose of the invention that fluoroionomer (I-2) of the solid particulate be provided with $H^+$ or $OH^-$ ions bound to at least a fraction of its ion exchange groups.

If fluoroionomer (I-2) has cations different from $H^+$ or anions different from $OH^-$ bound to all of its ion exchange groups, said ions might be introduced by effect of the ion exchange process in the liquid composition of fluoroionomer (I-1), consequently polluting the liquid dispersion intended to be purified.

Conversion into the protonated form (i.e. having $H^+$ cations bound to at least a fraction of the ion exchange groups) or the hydroxylated form (i.e. having $OH^-$ anions bound to at least a fraction of the ion exchange groups) of the fluoroionomer (I-2) of the solid particulate may be accomplished by means well known in the art, for example by treatment with any adequately strong acid or strong base, respectively.

Liquid composition comprising fluoroionomer (I-1) having monovalent metal cations bound to cation exchange groups can be handled and manufactured more easily than liquid compositions comprising $H^+$ ions bound to the cation exchange groups. Not only liquid compositions comprising $H^+$ ions bound to the cation exchange groups require higher temperature processing for achieving suitable dissolution/dispersion in the liquid medium, but they are also highly acidic and aggressive towards the equipment used in the process at the temperatures employed.

Liquid compositions comprising fluoroionomer (I-1) having sodium ($Na^+$) cations bound to cation exchange groups are preferred from the point of view of optimizing rheological behaviour, as they typically possess low liquid viscosities at room temperature and Newtonian behaviour at the same conditions, i.e. constant or nearly constant viscosity as a function of shear rate.

When purified by the process of the invention using a solid particulate comprising fluoroionomer (I-2) also comprising cation exchange groups, liquid compositions comprising fluoroionomer (I-1) having cations different from $H^+$, in particular alkaline metal ions, preferably sodium ions, bound to cation exchange groups are advantageously exchanged to their protonated forms and recovered as purified liquid composition comprising fluoroionomer (I-1) having $H^+$ cations bound to its cation exchange groups.

In this sense, the purification process of the invention can advantageously provide for the simultaneous protonation of fluoroionomer (I-1).

The expression "liquid composition" of fluoroionomer (I-1) shall be construed to encompass both true solutions of fluoroionomer (I-1) in liquid medium or dispersions of the same in a liquid medium.

The liquid composition of the invention comprises a liquid medium. Typically, the liquid composition comprises a liquid medium comprising water.

Generally, the liquid composition comprises a water or water/alcoholic mixture as liquid medium, optionally comprising additional ingredients and/or additives. Nevertheless, other liquid media can still be used (dimethylacetamide, dimethylformamide, dimethylsulfoxide, alcohols).

Suitable alcohols which can be used, in particular as water/alcoholic mixture, are notably methanol, ethanol, propyl alcohols (i.e. isopropanol, normalpropanol), ethylene glycol, diethylene glycol.

Good results have been obtained with liquid compositions wherein the liquid medium is essentially water or, as an alternative, a mixture of water and alcohol, more precisely water and propyl alcohol(s).

Typically, the purification process of the invention is carried out on liquid compositions having a solid content of less than 40 percent by weight (% wt.). Under these conditions, losses of fluoroionomer (I-1), e.g. by adsorption to the solid particulate, are minimized.

The liquid composition usable in the process of the invention can be advantageously manufactured by dispersion/dissolution of the fluoroionomer (I-1) in the liquid medium, as above detailed.

In case of a liquid composition wherein the liquid medium is essentially water or, as an alternative, a mixture of water and alcohol, said dispersion/dissolution is advantageously carried out at a temperature of at least 150° C., preferably of at least 180° C., more preferably of at least 200° C. This dispersion/dissolution is generally carried out under stirring in an autoclave.

The liquid composition generally comprises the fluoroionomer (I-1) under dissolved or dispersed form. The phrase "dissolved form" is intended herein to denote a 'true' solution of the fluoroionomer.

The phrase "dispersed form" is intended herein to denote a colloidal suspension of fluoroionomer (I-1), whereby particles of fluoroionomer having an average particle size of generally less than 500 nm are stably suspended with no settlement phenomena when left in an unperturbed state.

When in dispersed form, fluoroionomer (I-1) advantageously possesses an average particle size of 1 to 500 nm, preferably of 1 to 250 nm, even more preferably from 1 to 50 nm.

To carry out the process of the present invention liquid composition of fluoroionomer (I-1) is contacted with a solid particulate comprising fluoroionomer (I-2) having $H^+$ or $OH^-$ ions bound to at least a fraction of its ion exchange groups. Fluoroionomers (I-1) and (I-2) may be different or they may be the same polymer. The Applicant has found that, provided fluoroionomer (I-2) has $H^+$ or $OH^-$ ions bound to at least a fraction of its ion exchange groups, the purification process of the invention proceeds effectively even when fluoroionomer (I-1) and (I-2) are the same fluoroionomer (I).

During the purification process, as the $H^+$ or $OH^-$ ions are exchanged with the ionic impurities in the liquid composition the fraction of $H^+$ or $OH^-$ ions bound to fluoroionomer (I-2) will decrease. At the end of the purification process, or, alternatively as soon as the efficiency of the purification process is no longer acceptable, the solid particulate may be regenerated for instance by means of a treatment with a strong acid or a strong base, as known in the art.

Generally, to maintain high material throughput the purification process is carried out using liquid compositions having a solid content in the range of from at least 5% and up to 40% wt. of the liquid composition.

A solid content in the liquid composition between 10 and 30% wt. is particularly advantageous.

The process of the invention is generally carried out at a temperature ranging from 25 to 120° C.; upper temperature will be selected as a function of the liquid medium comprised in the liquid composition. It is generally understood that for liquid composition wherein the liquid medium comprises water, temperature will be generally selected between 25° C. and 90° C., preferably between 25° C. and 80° C.

It is also generally understood that the liquid composition of the invention has good flowability through the solid particulate at the operating temperature of the process of the invention. This typically means that the liquid viscosity of the liquid composition is generally of less than 400 Cpoise, preferably of less than 100 Cpoise, more preferably of less than 40 Cpoise, when measured at the temperature at which the process is carried out.

The person skilled in the art would advantageously select most appropriate liquid viscosity of the liquid composition to be purified as a function of the size of the solid particulate.

The expression "solid particulate" is used herein to denote discrete particles of solid matter comprising at least one fluoroionomer (I-2). Said solid particulate, when contacted with the liquid composition, possesses advantageously the property of being easily separable therefrom.

The solid particulate may comprise, in addition to the fluoroionomer (I-2) having $H^+$ or $OH^-$ ions bound to at least a fraction of its ion exchange groups, additional components, like notably an inert support, which can be at least partially coated with said fluoroionomer (I-2).

More generally, the solid particulate consists essentially of fluoroionomer (I-2). In this context the phrase "essentially consists" indicates that additives, stabilizers or other components, might be included in the solid particulate in minor amounts, e.g. less than 5% wt., preferably less than 2% wt., that do not modify the properties of fluoroionomer (I-2).

The solid particulate can be in the form of a powder, i.e. consisting of ground, pulverized, or otherwise finely dispersed solid particles, having an average particle size of from 1 to 1000 µm.

The solid particulate can be also in the form of pellets of geometrical size, e.g. as those obtained by extruding strands of fluoroionomer (I-2) and cutting them into pellets, generally having cylindrical shape. Sizes of pellets typically range from 0.5 mm to few millimeters.

Otherwise, the solid particulate can be in the form of beads having spherical shape, and diameter of at least 500 µm, preferably of at least 1000 µm; upper limit for diameter of beads is not particularly limited and generally can raise up to few centimeters. This form is particularly preferred in case of solid particulate comprising fluoroionomer (I-2) as above defined supported on an inert support.

Any other form of the solid particulate can be suitable for the purpose of the invention, provided that it enables easy separation of the particulate from the liquid composition.

Typically, the solid particulate of the process of the invention is in the form of powder, more preferably under the form of coagulated latex powder. This powder can be obtained from coagulation of a latex as obtained from the polymerization reaction of fluoroionomer (I-2). Coagulated powder has typically an average particle size of from 1 to 1000 µm, preferably of from 5 to 800 µm, more preferably of from 10 to 500 µm. The average particle size can be advantageously determined by sieving.

According to a first embodiment of the invention, the solid particulate may be used in a packed column configuration where the liquid composition of fluoroionomer (I-1) is passed through the column. In this method, the flow rate of the liquid composition through column is typically in the range of from 0.5 to 20 bed-volumes per hour, more typically 2 to 10 bed-volumes per hour, although lower and higher flow rates may also be used.

According to a second embodiment of the invention, the solid particulate can be used in a non-fixed resin bed configuration, that is to say, loose solid particulate may be added to the liquid composition of fluoroionomer (I-1), e.g. with mild agitation, and later removed by filtration. Ways to agitate include shaking a vessel containing the mixture of the liquid composition and solid particulate, stirring said mixture in a vessel with a stirrer, rotating the vessel, and bubbling a gas (e.g., nitrogen or air) through said mixture. A further method to cause agitation of the mixture is fluidizing the solid particulate. Fluidization may be caused by flowing the liquid composition through the solid particulate in a vessel whereby the flow of the liquid composition causes the solid particulate to swirl. The conditions of agitation are generally selected such that on the one hand, the solid particulate is fully contacted with the liquid composition (i.e., the solid particulate is completely immersed in the liquid composition), and yet the agitation conditions will be sufficiently mild so as to avoid damaging the solid particulate.

According to a third embodiment of the invention, the solid particulate of fluoroionomer (I-2) and the liquid composition comprising fluoroionomer (I-1) are contacted through a membrane; according to this embodiment, while ionic impurities can freely circulate through the membrane, fluoroionomer (I-1) can be advantageously prevented from entering in direct contact with the solid particulate.

First and second embodiments, as above detailed, are nevertheless preferred over this latter third embodiment.

Separation of the liquid composition from the solid particulate can be effected by standard methods. Any of filtration, decantation, sedimentation, centrifugation can be notably used. The selection of the more appropriate separation technique will be done by the skilled in the art having considered the particular size of the solid particulate and the viscosity of the liquid composition.

Filtration is, among others, a technique which has been found effective in the process of the invention.

The invention will be now described in more detail with reference to the following non-limiting examples.

Determination of Viscosity of Liquid Compositions

Liquid viscosity was determined using a dynamic mechanic rheometer Rheometric RFS III, using a 'couette' geometry (i.e. concentrically assembled cylinders) in steady rate sweep mode at a temperature of 25° C. Unless otherwise stated, both for liquid compositions showing Newtonian behaviour, i.e. constant or nearly (+/−10%) constant viscosity, and for those exhibiting non-Newtonian behaviour (variable viscosity as a function of shear rate), value mentioned in the example is that determined at 25° C. and a shear rate of 40 $sec^{-1}$.

PREPARATIVE EXAMPLE 1

Production of Ionomer Precursor ($-SO_2F$) Powder with EW 830

In a 22 liters autoclave, 11.5 liters of demineralized water, 980 g of the monomer with formula: $CF_2=CF-O-CF_2CF_2-SO_2F$ and 3100 g of a 5% weight solution of $CF_2ClO(CF_2CF(CF_3)O)_n(CF_2O)_mCF_2COOK$ in water with an average molecular weight of 521 and the ratio n/m=10 were introduced. The autoclave, stirred at 540 rpm, was heated to a temperature of 60° C. 150 ml of a water based solution containing 6 g/liter of potassium persulfate (KPS) were then added, and pressure was maintained at the set-point value of 13.5 Bar abs by addition of gaseous tetrafluoroethylene (TFE). After addition of 1000 g of TFE, further aliquots (175 g) of $CF_2=CF-O-CF_2CF_2-SO_2F$ were added every 200 g of consumed TFE. After 250 min, corresponding to a total TFE consumption of 3900 g, reactor was cooled and vented. The latex obtained therefrom was found to have a concentration of 28.2% by weight.

Part of the latex was then coagulated by freezing and thawing and the recovered polymer was washed with water and dried for 40 h at 150° C. A film was moulded in a press at 270° C. for 5 min. A square specimen 10×10 cm was cut therefrom, treated for 24 h in a KOH solution in water (10% by weight), rinsed with pure water, treated in a 20% by weight $HNO_3$ solution at room temperature, and finally washed with water. The polymer was in this way converted from the precursor ($-SO_2F$) form to the acid ($-SO_3H$) form. After drying in vacuum at 150° C., the film was titrated with diluted NaOH.

The equivalent weight of the polymer was found to be 830 g/eq. The remaining amount of latex was kept under nitrogen bubbling for 16 hours to strip away residual monomers from the polymerization, and then freezed in a plastic tank for 48 hours. After melting of the water, the coagulated ionomer was washed several times with demineralized water and dried in oven at 150° C. for 24 hours obtaining a dry powder of ionomer precursor.

PREPARATIVE EXAMPLES 2

Manufacture of a Ionomer Dispersion ($-SO_3Na$ Form) from the Polymer of Ex. 1

A portion of the polymer obtained from ex. 1 was treated for 10 hours in NaOH solution (10% by weight of NaOH, 10 liters of solution per Kg of polymer) at 80° C. and repeatedly rinsed with demineralized water until the pH of the water was found to be <9. The $-SO_3Na$ form polymer was then dried in a ventilated oven at 150° C. for 24 hours. An amount of 650 g of dry polymer was charged in an AISI316 autoclave with 2100 g of demineralized water and kept under moderate stirring (120 RPM) at 240° C. for 3 hours. After cooling, the obtained dispersion was centrifuged at 10000 RPM (HEMRLE Z36 HK) in order to remove the undissolved polymer fraction. Water was added in order to have a polymer dispersion containing 20% of $SO_3Na$ form polymer in water. Viscosity of this dispersion was found to be of 5.5 Cpoise in conditions specified above, with Newtonian behaviour.

PREPARATIVE EXAMPLE 3

Manufacture of Solid Particulate of Ionomer in $-SO_3H$ Form from Polymer of Example 1

A portion of the polymer obtained from ex. 1 was hydrolyzed with 10% NaOH, as above described, rinsed with water and further treated with a 20% aqueous solution of nitric acid, and finally rinsed with demineralized water until the pH was found to be >4. A solid particulate under the form of agglomerated powder in $-SO_3H$ form was dried in a ventilated oven at 80° C. for 48 hours.

EXAMPLE 4

Purification of the Ionomer Dispersion in $-SO_3Na$ Form of Ex. 2 with Solid Particulate of Ex. 3

An AISI304 filter assembly equipped with a relief valve was loaded with 1000 g of the $SO_3H$ form polymer powder, closed and contacted with demineralized water. Overpressure was set at 2 Bars gauge. Two liters of the polymer liquid dispersion in $-SO_3Na$ form as obtained in ex. 2 were fed through the filter (from upper side towards lower side) at a flow rate of 50 cc/min using a peristaltic pump (Masterflex L/S Cole&Palmer).

500 cc of demineralized water were then fed in the assembly for recovering residues of the dispersion.

The fluoroionomer liquid dispersion converted to the $SO_3H$ form was thus recovered as partially diluted composition; evaporation at 60° C. in a stirred glass vessel was performed for achieving 20% wt solids. Viscosity of this dispersion was found to be of 7 Cpoise in conditions specified above, with Newtonian behaviour. The dispersion had a pale-yellow colour, almost colourless.

ICP determinations showed Ni, Fe and Cr contents being each of less than <1 ppm. Total metal content was found to be <10 ppm.

Solid particulate fluoroionomer contained in the filter assembly was regenerated by contacting with 20% nitric acid solution, and rinsing with demineralized water.

PREPARATIVE EXAMPLE 5

Manufacture of a Ionomer Dispersion ($-SO_3K$ Form) from the Polymer of Ex. 1

A portion of the polymer obtained in ex. 1 was treated for 10 hours with a KOH solution (15% by weight of KOH, 7 liters of solution per Kg of polymer) at 80° C. and then repeatedly rinsed with demineralized water until the pH of the water was found to be <9. The $-SO_3K$ form fluoroionomer was then dried in a ventilated oven at 150° C. for 24 hours. An amount of 650 g of dry polymer was charged in an AISI316 autoclave with 2100 g of demineralized water and kept under moderate stirring (120 RPM) at 240° C. for 3 hours. After cooling, the obtained dispersion was centrifuged at 45° C. at 10000 RPM (HEMRLE Z36 HK) in order to remove the undissolved polymer fraction. Water was added in order to have a fluoroionomer liquid dispersion containing 20% of $SO_3K$ form fluoroionomer in water.

The liquid dispersion was found to posses a non-Newtonian behaviour at 25° C., with a viscosity of 950 Cpoise in the conditions specified above, and a Newtonian behaviour both at 45° C. (33 Cpoise at 40 s$^{-1}$) and at 60° C. (10 Cpoise at 40 s$^{-1}$).

EXAMPLE 6

Purification of the Ionomer Dispersion in $-SO_3K$ Form of Ex. 5 with Solid Particulate of Ex. 3

Same assembly and procedure described in example 4 were followed, but filter assembly was maintained at a temperature of 60° C., and liquid dispersion was pre-heated at 80° C.

Viscosity of the liquid purified and converted in $-SO_3H$ form dispersion was found to be of 8 Cpoise in the above specified conditions, with Newtonian behaviour.

ICP determinations showed Ni, Fe and Cr contents being each of less than <1 ppm. Total metal content was found to be <10 ppm.

COMPARATIVE EXAMPLE 7

Purification of the Ionomer Dispersion in $-SO_3K$ Form of Ex. 5 with Traditional Ion Exchange Resin Same assembly and procedure described in example 4 were followed, except that the filter was loaded with DOWEX®-50 resin, obtained in acidic form by treatment with a 8% HCl solution, followed by rinsing with water. Filter assembly was maintained at a temperature of 80° C., and liquid dispersion was pre-heated at 80° C.

The polymer dispersion converted into its $-SO_3H$ form recovered from the filter was concentrated by evaporation at 60° C. until reaching a solid content of 20%.

Said dispersion was found to possess a yellow-brownish colour, evidence of a contamination of organics from ion exchange resins. Neither further analysis nor characterization was pursued on this dispersion.

The invention claimed is:

1. A process for the purification from ionic impurities of a fluoroionomer liquid composition, said process comprising:

contacting a liquid composition, said liquid composition comprising at least one fluoroionomer (I-1) and ionic impurities in a liquid medium, with a solid particulate comprising at least one fluoroionomer (I-2) having ion exchange groups, wherein $H^+$ or $OH^-$ ions are bound to at least a fraction of said ion exchange groups; and separating said liquid composition from said solid particulate, wherein fluoroionomer (I-1) and fluoroionomer (I-2) are selected from fluoroionomers (I) comprising recurring units derived from at least one fluorinated functional monomer selected from:

sulfonated perfluoroolefins of formula (M1):

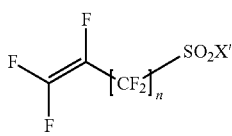
(M1)

wherein n is an integer between 0 and 6; and X' is selected from the group consisting of Cl, F, Br, I and $-O^-M^+$, wherein $M^+$ is a cation selected from the group consisting of $H^+$, $NH_4^+$, $K^+$, $Li^+$, $Na^+$, and mixtures thereof;

sulfonated perfluorovinylethers of formula (M2):

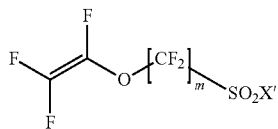
(M2)

wherein m is an integer between 1 and 10; and X' is selected from the group consisting of Cl, F, Br, I and $-O^-M^+$, wherein $M^+$ is a cation selected from the group consisting of $H^+$, $NH_4^+$, $K^+$, $Li^+$, $Na^+$, and mixtures thereof;

sulfonated perfluoroalkoxyvinylethers of formula (M3):

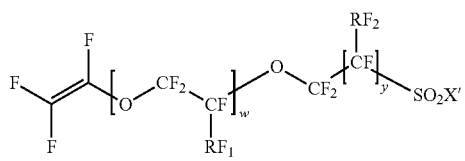
(M3)

wherein w is an integer between 0 and 2, $RF_1$ and $RF_2$, equal or different from each other and at each occurrence, are independently $-F$, $-Cl$ or a $C_{1-10}$ perfluoroalkyl group, y is an integer between 0 and 6; and X' is selected from the group consisting of Cl, F, Br, I and $-O^-M^+$, wherein $M^+$ is a cation selected from the group consisting of $H^+$, $NH_4^+$, $K^+$, $Li^+$, $Na^+$, and mixtures thereof;

sulfonated aromatic (per)fluoroolefins of formula (M5):

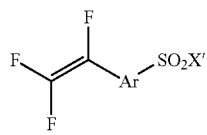
(M5)

wherein Ar is a $C_{3-15}$ aromatic or heteroaromatic moiety and X' is selected from the group consisting of Cl, F, Br, I and $-O^-M^+$, wherein M is a cation selected from the group consisting of $H^+$, $NH_4^+$, $K^+$, $Li^+$, $Na^+$, and mixtures thereof; and (M6) mixtures thereof.

2. The process of claim 1, wherein the fluoroionomer (I) is selected from the group consisting of tetrafluoroethylene (TFE) copolymers comprising recurring units derived from at least one functional per(halo)fluoromonomer.

3. The process of claim 2, wherein the fluoroionomer (I) is selected from the group consisting of TFE copolymers comprising recurring units derived from perfluoro-2-(2-fluorosulfonylethoxyl)propylvinyl ether [formula (M3-A)]:

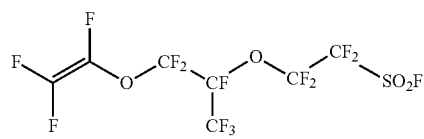
(M3-A)

and/or from perfuoro-5-sulphonylfluoride-3-oxa-1-pentene [formula (M2-D)]:

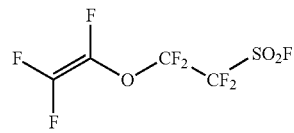
(M2-D)

in their $-SO_2F$ or $-SO_2X''$ form, wherein X'' is selected from the group consisting of Cl, Br, I and $-O^-M^+$, wherein $M^+$ is a cation selected from the group consisting of $H^+$, $NH_4^+$, $K^+$, $Li^+$, $Na^+$, and mixtures thereof.

4. The process according to claim 1, wherein the solid particulate comprises, in addition to the fluoroionomer (I-2) having $H^+$ or $OH^-$ ions bound to at least a fraction of its ion exchange groups, an inert support at least partially coated with said fluoroionomer (I-2).

5. The process according to claim 1, wherein the solid particulate consists essentially of fluoroionomer (I-2).

6. The process according to claim 1, wherein the solid particulate is in the form of powder.

7. The process according to claim 6, wherein the solid particulate is in the form of coagulated latex powder.

8. The process according to claim 1, wherein the separation of the liquid composition from the solid particulate is effected using a technique selected from the group consisting of filtration, decantation, sedimentation, and centrifugation.

9. The process according to claim 1, said process being a process for the purification from cationic impurities, wherein the liquid composition is purified until a residual total metal content of less than 10 ppm is obtained in the purified liquid composition.

10. The process according to claim 1, said process being a process for the purification from cationic impurities, wherein a liquid composition comprising fluoroionomer (I-1) having cations selected among $NH_4^+$, $K^+$, $Li^+$, $Na^+$ bound to its ion exchange groups is purified until a liquid composition comprising fluoroionomer (I-1) having $H^+$ cations bound to its ion exchange groups is obtained.

11. The process according to claim 6 wherein the solid particulate consists of ground, pulverized, or finely dispersed solid particles.

12. The process according to claim 11, wherein the solid particulate is in the form of coagulated latex powder.

13. The process according to claim 1, wherein fluoroionomer (I-1) and fluoroionomer (I-2) are the same fluoroionomer (I).

14. The process according to claim 1, wherein fluoroionomer (I-1) is selected from fluoroionomers (I) wherein X' is $Na^+$.

15. The process according to claim 1, wherein the liquid medium comprises water or a water/alcohol mixture.

16. The process according to claim 1, wherein the liquid composition has a solid content of between about 5% and about 40% by weight.

17. The process according to claim 1, wherein the liquid composition has a viscosity of less than about 400 Cpoise.

* * * * *